Dec. 25, 1951  F. W. BURGESSER  2,579,734
SEED PELLET
Filed Sept. 16, 1949
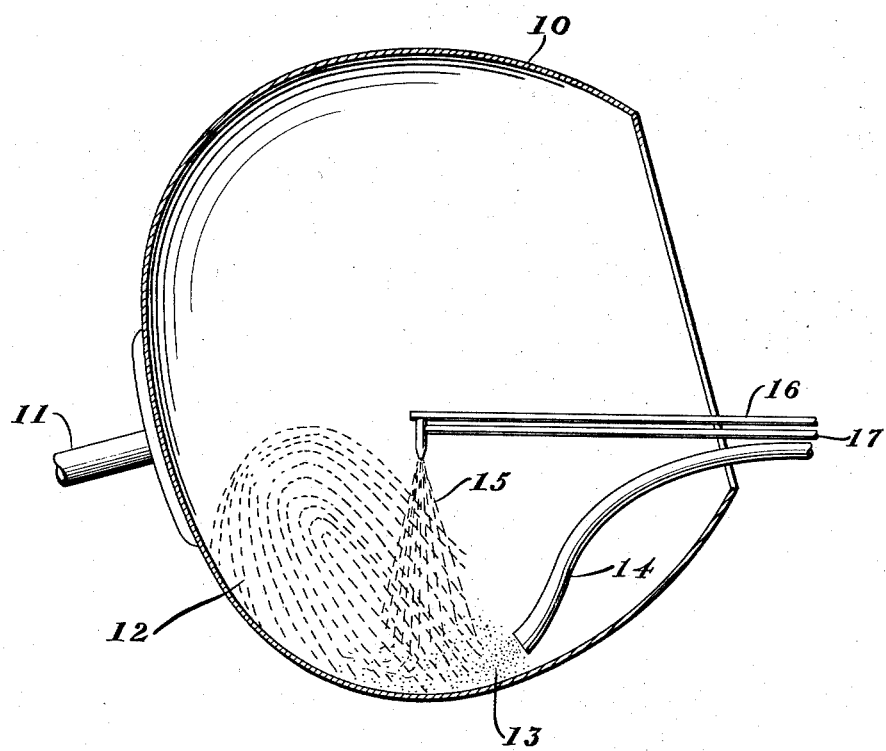
ATTEST
Elwood J. Schaffer
INVENTOR.
Frederick W. Burgesser
BY
Norbert E. Birch
Attorney Patented Dec. 25, 1951

2,579,734

UNITED STATES PATENT OFFICE 2,579,734

SEED PELLET

Frederick W. Burgesser, Compton, Calif., assignor to Filtrol Corporation, Los Angeles, Calif., a corporation of Delaware Application September 16, 1949, Serial No. 116,123

10 Claims. (Cl. 47—1)

1

This invention relates to coated seeds and more particularly to an improved coating for such seeds which comprises native sub-bentonite clay and heat expanded vermiculite.

In application Serial No. 698,384, filed September 20, 1946, by Stanard R. Funsten and the applicant, there is described and claimed the process and the product therefrom of forming on the seed a protective coating comprising native or raw sub-bentonite clay. The amount of coating applied to the seed is sufficient to increase the size and weight thereof and to change the shape of the seed so as to enable it to be planted by a mechanical planter. The coating comprising the sub-bentonite readily forms on the seed without the addition of any bonding material or excessive water and when dried is of sufficient hardness to withstand handling, particularly in a mechanical planter. When such seeds are planted the moisture in the soil is absorbed by the coating material causing the coating to expand and to soften. The coating holds the moisture next to the seed and provides the seed with the moisture necessary for germination. The softening and expanding of the coating permits the seeds to swell and germinate under ideal physical conditions.

While seeds treated according to the above identified application have had wide commercial success and are satisfactory for mechanical planting with a precision planting machine, I have found that there is need for an improved coating for seeds, particularly those planted under adverse conditions such as an excess of moisture. Seeds coated with native sub-bentonite which have been planted and exposed to an excess of water before germination have exhibited a lower percentage of germination. While I do not wish to be limited to any particular theory to account for this phenomenon, it is believed that the capillaries in a sub-bentonite coating are relatively small and that in the presence of excess moisture become filled with water or saturated with water vapor thereby resulting in a tendency for the seeds to drown or to become water logged and to suffocate since insufficient air reaches them because of the condition of the coating. In addition to this when seeds thus coated are planted and the soil is too tightly packed around the seed or when the seeds are planted too deeply or in heavy clay soils, with or without an excess of moisture, there is a tendency for the sub-bentonite coating to fail to break down and this also has a tendency to reduce the germination of the seeds. Under these conditions, even when experienced personnel are performing the planting, there is an ab-

2 normally low percentage of germination of the seeds. When inexperienced personnel such as amateur gardeners perform the planting operation there is a strong tendency to plant the seeds too deeply, to water them excessively and to pack the soil too tightly around the seeds. In such cases there is sometimes a complete failure of germination.

I have found that seeds coated with raw sub-bentonite clay, i. e., native sub-bentonite clay as distinguished from the acid-activated clay, and heat expanded or exfoliated vermiculite overcomes these difficulties. The principal objects and advantages of my invention reside in this fact. The coating may be applied as a mixture of sub-bentonite and exfoliated vermiculite or a thin layer of sub-bentonite may first be applied followed by applying the mixture or alternate layers of these materials. The novel and improved coating readily forms on seeds without the addition of any binding material or the excessive use of water and when dried is of sufficient hardness to withstand handling. It requires less moisture to disintegrate in the soil, displays resistance to water logging when excessive moisture is used after planting, and permits improved germination of the seed and emergence of the seedling when the planting takes place in heavy clay soils or when the soil is tightly packed around the seed. It is believed that the improved results are due to the lower density and the larger capillaries of the novel coating. In addition, the novel coating does not need to swell as much nor need it crack since the pore size of the vermiculite is large enough to permit ingress of air to the seed and the egress of the rootlets.

Any sub-bentonite may be used in practicing my invention. Sub-bentonites are a class of montmorillonite clays in which the base exchange capacity of the clay is largely satisfied by calcium and magnesium ions. Such clays are usually alkaline earth bentonites and are of a class of bentonites which are activatable by acid treatment to produce activated adsorbents and petroleum and cracking catalysts. These are substantially non-swelling when compared with ordinary swelling bentonites, the base exchange ions of the latter being largely alkaline ions, particularly sodium ions. Typical of sub-bentonites which may be used in practicing my invention are those mined at Cheto, Arizona, those near Lemon and Avery, Mississippi, and near Otay, California. Typical analysis of such non-swelling bentonites on a volatile matter free basis (i. e., after heating to 1700° F. without further loss of weight) are as follows: 59.6 to 69 per cent $SiO_2$; 19.5 to 26.0 per cent $Al_2O_3$; 3 to 7 per cent MgO; 1.5 to 3 per cent CaO; and $Na_2O$ in quantities of less than 1.5 per cent. The base exchange capacity of this non-swelling bentonite is from 80 to 130 milliequivalents per 100 grams of volatile-free clay.

The vermiculite used in the present invention is a heat expanded product which is available commercially and at present is used as an insulating material. The unexpanded vermiculite is a mica-like mineral retaining more or less perfectly the micaceous cleavage. The laminae in general are soft, pliable, and inelastic; the luster pearly or bronze-like, and the color varies from white to yellow and brown or black. The mineral vermiculite is variously known as: Jeffersite, vermiculite, culsageeite, kerrite, lennilite, hallite, philadelphite, vaalite, maconite, dudleyite, pyroscierite, weathered biotite. It is generally formed as a result of alteration of biotite, phlogopite or other varities of mica. The vermiculites have a rather indefinite composition but analyses indicate that the chemical constitution can be approximated by the formula:

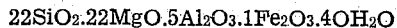
$$22SiO_2.22MgO.5Al_2O_3.1Fe_2O_3.4OH_2O$$

It is believed that this material is built up of layers having unit cells of the approximate composition:

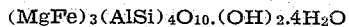
$$(MgFe)_3(AlSi)_4O_{10}.(OH)_2.4H_2O$$

each pair of sheets being separated by four molecules of water. On heating the mineral, a most remarkable phenomenon occurs to which the term exfoliation has been applied. On exfoliation, vermiculite expands enormously, the volume increase being as great as sixteen fold so that a final product is produced having a bulk density of about ten pounds per cubic foot or less. Expansion during exfoliation is largely unidirectional. The flat mica-like plates of the original mineral separate greatly as exfoliation proceeds while the area of the original mineral particle remained substantially unchanged. Exfoliation can best be compared with the expansion of an accordion. This characteristic is responsible for the name from the Latin vermiculari—to breed worms.

I have found that germination of the seed and emergence of the seedling, particularly under adverse conditions of planting, are improved as increasing amounts of heat expanded vermiculite are used in combination with the raw sub-bentonite clay. The improvement is substantial when a coating is used having about 7 per cent by weight of heat expanded vermiculite and about 93% by weight of sub-bentonite clay. This corresponds to about 25% by volume of vermiculite and 75% by volume of sub-bentonite. Further improvements take place as the proportion of the heat expanded vermiculite is increased to about 30 per cent by weight which corresponds to about 75 per cent by volume of vermiculite. Additional improvement is experienced with higher proportions of the heat expanded vermiculite but it is preferable not to use such higher proportions both because of economic considerations and because the coating tends to become friable and soft. I prefer for most purposes a coating comprising about 7–30% by weight of heat expanded vermiculite and about 70–93% by weight of sub-bentonite clay corresponding respectively by volume to 25–75% of vermiculite and to 25–75% of sub-bentonite. In general, a coating having about 15% by weight of the vermiculite and about 85% by weight of sub-bentonite corresponding to 50% by volume of each of these constituents gives best results.

The above percentages are based on substantially pure exfoliated vermiculite. It is possible also to obtain substantially the same results by using an exfoliated product of ordinary commerical purity such as one contaminated with up to 15% by weight of rock dust. Such an exfoliated vermiculite may have a density up to 20 pounds per cubic foot whereas the substantially pure exfoliated product weighs about 10 pounds per cubic foot. When such commercial vermiculite is used, the weight percentages mentioned in the preceding paragraph, in terms of the commercial vermiculite, are increased proportionately depending upon the rock dust contained in the commercial product and the percentage by weight of sub-bentonite is correspondingly lowered; the volume percentage of the vermiculite, however, remains substantially in the range of 25–75%.

In addition to rock dust, other diluent material or materials may be added to the coating and such materials may or may not be inert to the seed, such as, for example, alluvial clay, sand, wood flour or other cellulosic material, acid activated sub-bentonite, fertilizer, etc. When a fertilizer is used, it should not be used in quantities that would be toxic to the seed or seedling resulting from the germination of the seed. When diluents are present in the coating, the coating should contain not less than 50% by weight of sub-bentonite clay and the exfoliated vermiculite should be present in amounts within the preferred range, e. g., 7–30% by weight.

The invention will be further illustrated by the accompanying drawing and the discussion thereof which disclose specific features of the invention. The drawing however is given for purposes of illustration and the invention in its broader aspects is not limited thereto.

Referring to the drawing, the numeral 10 designates an engrossing pan similar to those in common use by candy makers. The engrossing pan 10 is rotatable on a tilted axis 11. A suitable quantity of seeds, which are designated in the drawing by the reference numeral 12, are placed in the engrossing pan. The appropriate mixture of heat expanded vermiculite and raw sub-bentonite clay, designated in the drawing by the reference numeral 13, is slowly added to the engrossing pan through the spout 14. The seeds and the mixture of coating material are sprayed by a finely atomized water spray 15 formed from water flowing through pipe 16 and compressed air flowing through pipe 17. The engrossing pan 10 is rotated continuously during the addition of the coating mixture 13 and the water spray 15, and the rotation may be continued after a sufficient quantity of water and clay mixture has been added.

The water spray 15 slightly moistens the seeds 12 and the mixture 13. During rotation of the engrossing pan 10 the seeds become coated with the moist clay mixture. The mixture is coated uniformly on the seeds and the resulting pellets are substantially uniform in size and shape. The thickness of the coating can be controlled by controlling the amount of clay mixture which is supplied through the spout 14. The quantity of water should be limited to that which is necessary to assure proper coating and may easily be ascertained by observation and inspection.

An equally desirable procedure in coating and one which accomplishes superior results particularly with small seeds such as, for example, petunia seeds is first to coat the seeds in the engrossing pan 10 in the manner described above with a relatively thin layer of sub-bentonite preferably in sufficient quantity to cover the entire surface of the seed and then to apply the desired mixture in the desired amount. Alternatively, although it is not preferred, after the initial thin coating of sub-bentonite is applied it may be followed by successive layers of exfoliated vermiculite and sub-bentonite until the desired final size is reached, the layers of these materials being of such thickness as to give the desired composition by weight to the aggregate coating. When a diluent material is to be used it may be mixed in appropriate amounts with either or both the vermiculite or the sub-bentonite or mixtures of these materials.

The seeds are removed from the engrossing pan and are handled with reasonable care while the coating is moist. The coating is dried at a temperature which is below the temperature which would effect sterilization of the seeds. The coating is dried sufficiently to prevent the possibility of unintentional germination of the seeds, but it should not be dried to the extent of removal of lattice water or water of crystallization from the components of the coating mixture. I have found it desirable to dry the coating to the point where it contains about 5 per cent to 25 per cent by weight of volatile matter and preferably to about 10 per cent.

Any variety of seeds may be coated with my novel composition to permit ease of handling in a mechanical planter and to improve their germinating characteristics when planted under adverse conditions. Thus tree, cotton and sugar beet seeds, etc. may be treated. The invention is especially useful in connection with field vegetable seeds such as lettuce, tomato, onion, carrot, cabbage, broccoli, cauliflower, brussels sprouts, celery, spinach, etc. Flower seeds may likewise be treated such as petunias, snapdragons, poppies, pansies, delphiniums, zinnias, carnations and the like.

It is desirable to control the particle size of the components of my novel coating. I prefer to use a native sub-bentonite having a mesh analysis showing approximately 100% through a 40 mesh screen and about 10% through a 325 mesh screen and a heat expanded vermiculite having a mesh analysis showing the following percentages passing through the corresponding screen size; 100 per cent through 16 mesh; 70 per cent through 60 mesh; 45 per cent through 100 mesh; 25 per cent through 200 mesh and 15 per cent through 270 mesh. When diluent material is added to the coating, the particle size of such material is preferably that of the preferred size for the sub-bentonite. Particle sizes above and below these preferred ranges may also be used for the native sub-bentonite, the exfoliated vermiculite and diluent material.

In all cases in practicing the instant invention, the seed by virtue of the novel coating is converted to a pellet with a seed imbedded therein and having entirely different characteristics from those of the seed. The heavy protective coating not only enhances the germinating characteristics of the seed particularly under adverse conditions during and after planting but because of the size of the pellet it is readily handled in a mechanical planter or a precision planting machine and moreover home gardeners, especially in the case of small seeds, may handle the seeds individually for proper interval planting. In general sufficient coating is applied to a seed in amounts to increase its weight 4 to 500 times by weight of that of the seed. It is readily seen that regardless of the size and shape of the seed a substantially round pellet may be formed by the addition of sufficient coating and when coated as set forth herein, seeds of uniform size are obtained.

I claim:

1. A seed pellet consisting of a plant seed embedded in a hard, dry, smooth, outer coating of a naturally adhesive composition, said coating comprising finely divided native sub-bentonite clay and exfoliated vermiculite compacted as a unit about the seed by the inherent adhesivity of the finely divided sub-bentonite clay, said pellet having a thickness at least several times greater than the original plant seed and said coating being readily disintegrated upon contact with moisture.

2. A seed pellet consisting of a plant seed embedded in a hard, dry, smooth, outer coating of a naturally adhesive composition, said coating comprising at least fifty per cent by weight of finely divided native sub-bentonite clay and from about seven to about thirty per cent by weight of exfoliated vermiculite compacted as a unit about the seed by the inherent adhesivity of the finely divided sub-bentonite clay, said pellet having a thickness at least several times greater than the original plant seed and said coating being readily disintegrated upon contact with moisture.

3. A seed pellet consisting of a plant seed embedded in a hard, dry, smooth, outer coating of a naturally adhesive composition, said coating comprising about eighty-five per cent by weight of finely divided native sub-bentonite and about fifteen per cent by weight of exfoliated vermiculite compacted as a unit about the seed by the inherent adhesivity of the finely divided sub-bentonite clay, said pellet having a thickness at least several times greater than the original plant seed and said coating being readily disintegrated upon contact with moisture.

4. A seed pellet consisting of a plant seed embedded in a hard, dry, smooth, outer coating of a naturally adhesive composition, said coating comprising a mixture of finely divided native sub-bentonite clay and exfoliated vermiculite compacted as a unit about the seed by the inherent adhesivity of the finely divided sub-bentonite clay, said pellet having a thickness at least several times greater than the original plant seed and said coating being readily disintegrated upon contact with moisture.

5. A seed pellet consisting of a plant seed embedded in a hard, dry, smooth, outer coating of a naturally adhesive composition, said coating comprising a mixture of at least sixty per cent by weight of finely divided native sub-bentonite clay and from about seven per cent to about thirty per cent by weight of exfoliated vermiculite compacted as a unit about the seed by the inherent adhesivity of the finely divided sub-bentonite clay, said pellet having a thickness at least several times greater than the original plant seed and said coating being readily disintegrated upon contact with moisture.

6. A seed pellet consisting of a plant seed embedded in a hard, dry, smooth, outer coating of a naturally adhesive composition, said coating comprising a mixture of finely divided native sub-bentonite clay and exfoliated vermiculite and having a layer of finely divided sub-bentonite clay immediately adjacent the seed and between the seed and said mixture, the whole of said coating being compacted as a unit about the seed by the inherent adhesivity of the finely divided sub-bentonite clay, said pellet having a thickness at least several times greater than the original plant seed and said coating being readily disintegrated upon contact with moisture.

7. A seed pellet consisting of a plant seed embedded in a hard, dry, smooth, outer coating of a naturally adhesive composition, said coating comprising a mixture of at least fifty per cent by weight of finely divided native sub-bentonite clay and from about seven to about thirty per cent by weight of exfoliated vermiculite and having a layer of finely divided sub-bentonite clay immediately adjacent the seed and between the seed and said mixture, the whole of said coating being compacted as a unit about the seed by the inherent adhesivity of the finely divided sub-bentonite clay, said pellet having a thickness at least several times greater than the original plant seed and said coating being readily disintegrated.

8. A seed pellet consisting of a plant seed embedded in a hard, dry, smooth, outer coating of a naturally adhesive composition, said coating being composed of successive alternate layers comprising, respectively, finely divided native sub-bentonite clay and exfoliated vermiculite, the whole of said coating being compacted as a unit about the seed by the inherent adhesivity of the finely divided sub-bentonite clay, said pellet having a thickness at least several times greater than the original plant seed and said coating being readily disintegrated upon contact with moisture.

9. A seed pellet consisting of a plant seed embedded in a hard, dry, smooth, outer coating of a naturally adhesive composition, said coating being composed of an initial layer of finely divided native sub-bentonite clay and successive alternate layers comprising, respectively, exfoliated vermiculite and finely divided native sub-bentonite clay, the whole of said coating being compacted as a unit about the seed by the inherent adhesivity of the finely divided sub-bentonite clay, said pellet having a thickness at least several times greater than the original plant seed and said coating being readily disintegrated upon contact with moisture.

10. A seed pellet consisting of a plant seed embedded in a hard, dry, smooth, outer coating of a naturally adhesive composition, said coating being composed of an initial layer of finely divided native sub-bentonite clay and successive alternate layers first of a mixture of finely divided sub-bentonite clay and exfoliated vermiculite and secondly, of finely divided sub-bentonite clay, the whole of said coating being compacted as a unit about the seed by the inherent adhesivity of the finely divided sub-bentonite clay, said pellet having a thickness at least several times greater than the original plant seed and said coating being readily disintegrated upon contact with moisture.

FREDERICK W. BURGESSER.

REFERENCES CITED

The following references are of record in the file of this patent:

UNITED STATES PATENTS

| Number | Name | Date |
|---|---|---|
| 1,819,953 | Funk | Aug. 18, 1931 |
| 2,328,644 | Happe | Sept. 7, 1943 |
| 2,502,809 | Vogelsang | Apr. 4, 1950 |